Sept. 24, 1935.                J. A. HAMILTON                2,015,636
                              STORAGE BATTERY PLATE
                              Filed Aug. 27, 1932
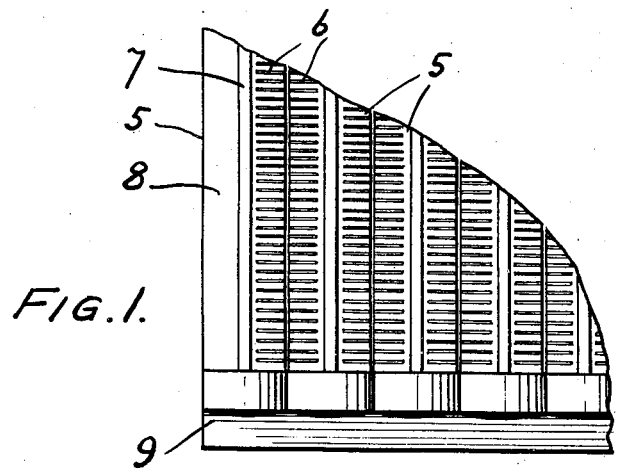
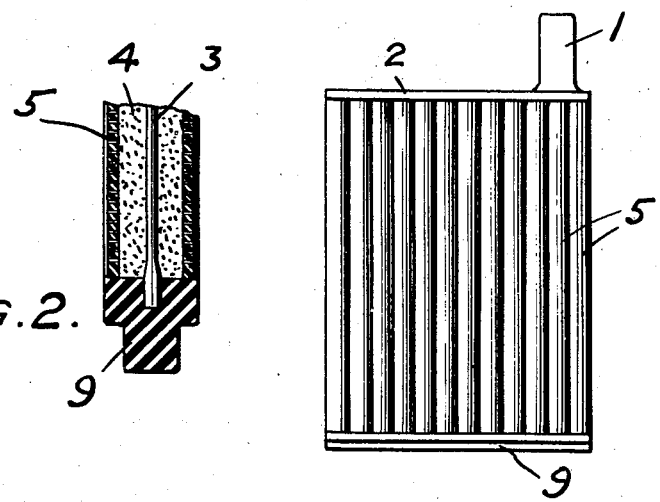
INVENTOR
John A. Hamilton
BY
Augustus B. Stoughton
ATTORNEY.

Patented Sept. 24, 1935

2,015,636

UNITED STATES PATENT OFFICE 2,015,636

STORAGE BATTERY PLATE

John A. Hamilton, Philadelphia, Pa., assignor to The Electric Storage Battery Company, Philadelphia, Pa., a corporation of New Jersey Application August 27, 1932, Serial No. 630,620

5 Claims. (Cl. 136—55)

The subject of my invention is a storage battery plate having a bottom bar of acid-resisting, insulating material. More specifically, my invention consists of a storage battery plate of the type consisting of a metallic grid, consisting of a lug, a top bar, and a plurality of spines, active material surrounding each of said spines, perforated tubes of insulating material surrounding each of said spines and the active material thereon, and a bottom bar of acid resisting, insulating material connecting the lower ends of said spines and closing and connecting the lower ends of said tubes.

The objects of my invention are to connect the lower ends of the spines by an insulating bottom bar integral with the tubes; to provide a plug for the lower ends of the tubes which shall be integral therewith; to preclude the possibility of a short-circuit between the bottoms of adjacent negative and positive plates, even when the sediment in the bottom of the cell has collected to such a height as to come in contact with the bottoms of both plates, and to provide a bottom bar of lighter weight than that commonly used.

For a further exposition of my invention reference may be had to the annexed specification and drawing at the end of which my invention will be specifically pointed out and claimed.

In the drawing,

Figure 1 is a side elevation of a portion of a plate.

Figure 2 is a vertical cross section through a portion of the plate at right angles to Figure 1.

Figure 3 is a side elevation of a complete plate.

I have illustrated in the drawing one embodiment which my device may take and which consists of a plate having a grid of metal preferably lead or lead alloy. This grid consists of a lug 1, a top bar 2 and a plurality of spines 3, the latter being best shown in Figure 2. Surrounding each of the spines 3, there is active material 4 consisting of lead oxide, a mixture of oxides or other suitable material. Surrounding each of the spines 3 and the active material thereon there are provided perforated tubes 5 each of which has a plurality of perforations 6 therein. Perforations 6 preferably consist of narrow horizontal slots. The tubes 5 are also each provided with a pair of ribs 7 on those surfaces which form the faces of the plates. The outer tubes have their surfaces which form the edges of the plate unperforated, see Fig. 1 at 8.

The bottom edge of the plate is formed of acid-resisting, insulating material in the form of a bottom bar 9. Bottom bar 9 has the lower ends of the spines 3 embedded therein and also connects and closes the bottom ends of the tubes 5 thus serving to retain the active material therein. After the grid has been threaded into the porous tubes, and the latter have been filled with active material, a mass of plastic unvulcanized rubber stock is placed over the open ends of the tubes, and the projecting spines of the grid. A suitable mold is then applied to this mass of stock, so as to press it into the desired shape, after which it is vulcanized by application of heat, according to well-known methods. By this method the rubber bottom bar is caused to adhere integrally to the open ends of the tubes, and also to flow around the projecting ends of the spines, so as to remain firmly in place during the life of the plate. Other suitable insulating material may of course be substituted for rubber.

Tubes 5 form an envelope surrounding the active material 4. This envelope may conveniently be made of one integral casing surrounding all the active material, or an integral casing having a plurality of cavities for the active material therein, or of one or more parts fastened together by any convenient means.

I do not intend to be limited in the practice of my invention save as the scope of the prior art and of the attached claims may require.

I claim:

1. A storage battery plate comprising a grid of metal having separated bottom portions, active material on said grid, a permeable envelope of insulating material surrounding the lateral sides of the active material, and a bottom bar of acid-resisting, insulating material gripping and connecting the bottom portions of said grid and closing and connecting the bottom portion of and united integrally with said envelope.

2. A storage battery plate consisting of a grid of metal having separated bottom portions, active material on said grid, a plurality of tubes of insulating material surrounding portions of said grid and portions of the active material thereon, and a bottom bar of insulating material gripping and connecting the bottom portions of said grid and closing and connecting the bottom portions of and being united integrally with said tubes.

3. A storage battery plate including a lug of metal, a top bar of metal, a plurality of spines of metal connected to said top bar, active material surrounding each of said spines, a perforated tube of insulating material surrounding each of said spines and the active material thereon, and a bottom bar of insulating material having the bottoms of said spines embedded therein and connected to and closing the bottoms of and formed integrally with said tubes.

4. A plate for an electric storage battery comprising in combination, a grid of metal having separated bottom portions, active material surrounding parts of said grid, an envelope of insulating material surrounding said parts of the grid and the active material thereon, and a bottom bar of insulating material gripping and connecting the bottoms of said parts of said grid and united with said envelope to form an integral vulcanized body of insulating material.

5. A storage battery plate comprising, a grid consisting of separate metallic rods integrally attached to a metallic top bar, active material surrounding said rods, a permeable envelope of insulating material surrounding the lateral sides of the active material, and a bottom bar of rubber composition completely enclosing and vulcanized on the lower ends of the metallic rods and integrally attached and vulcanized to the lower ends of the permeable envelopes.

JOHN A. HAMILTON.